(12) United States Patent
Bowles

(10) Patent No.: US 9,881,284 B2
(45) Date of Patent: Jan. 30, 2018

(54) MINI-KIOSK FOR RECYCLING ELECTRONIC DEVICES

(71) Applicant: ecoATM, Inc., San Diego, CA (US)

(72) Inventor: Mark Vincent Bowles, La Jolla, CA (US)

(73) Assignee: ecoATM, Inc., San Diego, CA (US)

( * ) Notice: Subject to any disclaimer, the term of this patent is extended or adjusted under 35 U.S.C. 154(b) by 865 days.

(21) Appl. No.: 13/792,030

(22) Filed: Mar. 9, 2013

(65) Prior Publication Data

US 2013/0191236 A1    Jul. 25, 2013

Related U.S. Application Data

(63) Continuation-in-part of application No. 13/438,924, filed on Apr. 4, 2012, which is a continuation-in-part of application No. 12/785,465, filed on May 23, 2010, now Pat. No. 8,200,533, which is a continuation-in-part of application No. 12/727,624, filed on Mar. 19, 2010, now Pat. No. 7,881,965, which is a continuation-in-part of application No.
(Continued)

(51) Int. Cl.
| | |
|---|---|
| G06Q 10/00 | (2012.01) |
| G06Q 30/08 | (2012.01) |
| H04M 1/02 | (2006.01) |
| G06Q 30/02 | (2012.01) |
| H04M 1/24 | (2006.01) |

(52) U.S. Cl.
CPC ......... *G06Q 10/30* (2013.01); *G06Q 30/0278* (2013.01); *G06Q 30/08* (2013.01); *H04M 1/0287* (2013.01); *H04M 1/24* (2013.01); *Y02W 90/20* (2015.05)

(58) Field of Classification Search
None
See application file for complete search history.

(56) References Cited

U.S. PATENT DOCUMENTS

| | | |
|---|---|---|
| 3,808,439 A | 4/1974 | Renius |
| 4,248,334 A | 2/1981 | Hanley et al. |
| 4,519,522 A | 5/1985 | McElwee et al. |
| | (Continued) | |

FOREIGN PATENT DOCUMENTS

| | | |
|---|---|---|
| CN | 1365479 | 8/2002 |
| CN | 2708415 | 7/2005 |
| | (Continued) | |

OTHER PUBLICATIONS

Rehg et al., Vision for a Smart Kiosk, 1997 IEEE Computer Society Conference on Computer Vision and Pattern Recognition.
(Continued)

*Primary Examiner* — Jan P Mincarelli
(74) *Attorney, Agent, or Firm* — Perkins Coie LLP

(57) ABSTRACT

A mini-kiosk for recycling and financial remuneration for submission of an electronic device such as a mobile phone is disclosed herein. The mini-kiosk is designed to be placed on a counter-top. The mini-kiosk includes electrical connectors and an inspection area with at least one camera in order to perform a visual analysis and an electrical analysis of the electronic device for determination of a value of the electronic device. The mini-kiosk also includes a processor and a display for user interaction.

20 Claims, 9 Drawing Sheets

Related U.S. Application Data

12/573,089, filed on Oct. 2, 2009, now Pat. No. 8,195,511.

(60) Provisional application No. 61/102,304, filed on Oct. 2, 2008, provisional application No. 61/183,510, filed on Jun. 2, 2009, provisional application No. 61/472,611, filed on Apr. 6, 2011.

(56) References Cited

U.S. PATENT DOCUMENTS

| | | | |
|---|---|---|---|
| 4,593,820 A | 6/1986 | Antonie et al. | |
| 4,870,357 A | 9/1989 | Young et al. | |
| 4,878,736 A | 11/1989 | Hekker et al. | |
| 4,927,051 A | 5/1990 | Falk et al. | |
| 4,951,308 A | 8/1990 | Bishop et al. | |
| 5,077,462 A | 12/1991 | Newell et al. | |
| 5,091,773 A | 2/1992 | Fouche et al. | |
| 5,105,149 A | 4/1992 | Tokura | |
| 5,280,170 A | 1/1994 | Baldwin et al. | |
| 5,339,096 A | 8/1994 | Beaufort et al. | |
| 5,419,438 A | 5/1995 | Squyres et al. | |
| 5,570,920 A | 11/1996 | Crisman et al. | |
| 5,572,444 A | 11/1996 | Lentz et al. | |
| 5,610,710 A | 3/1997 | Canfield et al. | |
| 5,717,780 A | 2/1998 | Mitsumune et al. | |
| 5,748,084 A | 5/1998 | Isikoff | |
| 5,775,806 A | 7/1998 | Allred | |
| 5,839,058 A | 11/1998 | Phillips et al. | |
| 5,949,901 A | 9/1999 | Nichani et al. | |
| 5,965,858 A | 10/1999 | Suzuki et al. | |
| 5,966,654 A | 10/1999 | Croughwell et al. | |
| 5,987,159 A | 11/1999 | Nichani | |
| 5,988,431 A | 11/1999 | Roe et al. | |
| 6,029,851 A | 2/2000 | Jenkins et al. | |
| 6,041,229 A | 3/2000 | Turner et al. | |
| 6,100,986 A | 8/2000 | Rydningen | |
| 6,228,008 B1 | 5/2001 | Pollington et al. | |
| 6,259,827 B1 | 7/2001 | Nichani | |
| 6,264,104 B1 | 7/2001 | Jenkins et al. | |
| 6,330,354 B1 | 12/2001 | Companion et al. | |
| 6,330,958 B1 * | 12/2001 | Ruskin et al. | 221/75 |
| 6,393,095 B1 | 5/2002 | Robinson | |
| 6,462,644 B1 | 10/2002 | Howell et al. | |
| 6,529,837 B1 | 3/2003 | Kang | |
| 6,535,637 B1 | 3/2003 | Wootton et al. | |
| 6,587,581 B1 | 7/2003 | Matsuyama et al. | |
| 6,595,684 B1 | 7/2003 | Casagrande et al. | |
| 6,633,377 B1 | 10/2003 | Weiss et al. | |
| 6,667,800 B1 | 12/2003 | Larsson et al. | |
| 6,748,296 B2 | 6/2004 | Banerjee et al. | |
| 6,754,637 B1 | 6/2004 | Stenz | |
| 6,758,370 B2 | 7/2004 | Cooke et al. | |
| 6,798,528 B1 | 9/2004 | Hartman | |
| 6,822,422 B2 | 11/2004 | Sagawa | |
| 6,842,596 B2 | 1/2005 | Morii et al. | |
| 6,854,656 B2 | 2/2005 | Matsumori | |
| 7,069,236 B1 | 6/2006 | Tsunenari | |
| 7,076,449 B2 | 7/2006 | Tsunenari et al. | |
| 7,234,609 B2 | 6/2007 | DeLazzer et al. | |
| 7,251,458 B2 | 7/2007 | O'Connell | |
| 7,268,345 B2 | 9/2007 | Schultz | |
| 7,334,729 B2 | 2/2008 | Brewington et al. | |
| 7,520,666 B2 | 4/2009 | Pevzner et al. | |
| 7,567,344 B2 | 7/2009 | LeBlanc et al. | |
| 7,646,193 B2 | 1/2010 | Suzuki et al. | |
| 7,702,108 B2 | 4/2010 | Amon et al. | |
| 7,735,125 B1 | 6/2010 | Alvarez et al. | |
| 7,761,331 B2 | 7/2010 | Low et al. | |
| 7,783,379 B2 | 8/2010 | Beane et al. | |
| 7,848,833 B2 | 12/2010 | Li et al. | |
| 7,881,965 B2 | 2/2011 | Bowles et al. | |
| 8,019,588 B1 | 9/2011 | Wohlberg et al. | |
| 8,025,229 B2 | 9/2011 | Hammond et al. | |
| 8,031,930 B2 | 10/2011 | Wang et al. | |
| 8,107,243 B2 | 1/2012 | Guccione et al. | |
| 8,112,325 B2 | 2/2012 | Foy et al. | |
| 8,195,511 B2 | 6/2012 | Bowles et al. | |
| 8,200,736 B2 | 6/2012 | Shi et al. | |
| 8,215,546 B2 | 7/2012 | Lin et al. | |
| 8,239,262 B2 | 8/2012 | Bowles et al. | |
| 8,254,883 B2 | 8/2012 | Uchida | |
| 8,266,008 B1 | 9/2012 | Siegel et al. | |
| 8,423,404 B2 | 4/2013 | Bowles et al. | |
| 8,463,646 B2 | 6/2013 | Bowles et al. | |
| 8,718,717 B2 | 5/2014 | Vaknin et al. | |
| 8,743,215 B1 | 6/2014 | Lee | |
| 8,806,280 B2 | 8/2014 | Stephenson et al. | |
| 8,823,794 B2 | 9/2014 | Waring et al. | |
| 9,043,026 B2 | 5/2015 | Lien et al. | |
| 9,189,911 B2 | 11/2015 | Kavli et al. | |
| 9,317,989 B2 | 4/2016 | Grow et al. | |
| 2001/0039531 A1 | 11/2001 | Aoki | |
| 2002/0014577 A1 | 2/2002 | Ulrich et al. | |
| 2002/0035515 A1 | 3/2002 | Moreno | |
| 2002/0067184 A1 | 6/2002 | Smith et al. | |
| 2002/0087413 A1 | 7/2002 | Mahaffy et al. | |
| 2002/0112177 A1 | 8/2002 | Voltmer et al. | |
| 2002/0157033 A1 | 10/2002 | Cox | |
| 2002/0162966 A1 | 11/2002 | Yoder | |
| 2002/0186878 A1 | 12/2002 | Hoon et al. | |
| 2003/0025476 A1 | 2/2003 | Trela | |
| 2003/0036866 A1 | 2/2003 | Nair et al. | |
| 2003/0061150 A1 | 3/2003 | Kocher et al. | |
| 2003/0146898 A1 | 8/2003 | Kawasaki et al. | |
| 2003/0170529 A1 | 9/2003 | Sagawa | |
| 2003/0191675 A1 | 10/2003 | Murashita | |
| 2003/0204289 A1 | 10/2003 | Banerjee et al. | |
| 2004/0012825 A1 | 1/2004 | Tesavis | |
| 2004/0088231 A1 | 5/2004 | Davis | |
| 2004/0114153 A1 | 6/2004 | Andersen et al. | |
| 2004/0141320 A1 | 7/2004 | Bock et al. | |
| 2004/0150815 A1 | 8/2004 | Sones et al. | |
| 2004/0156557 A1 | 8/2004 | Van Der Weij et al. | |
| 2004/0186744 A1 | 9/2004 | Lux et al. | |
| 2004/0189812 A1 | 9/2004 | Gustavsson et al. | |
| 2004/0200902 A1 | 10/2004 | Ishioroshi | |
| 2004/0205015 A1 | 10/2004 | DeLaCruz | |
| 2004/0235513 A1 | 11/2004 | O'Connell | |
| 2004/0242216 A1 | 12/2004 | Boutsikakis | |
| 2004/0262521 A1 | 12/2004 | Devitt et al. | |
| 2005/0128551 A1 | 6/2005 | Yang | |
| 2005/0143149 A1 | 6/2005 | Becker et al. | |
| 2005/0167620 A1 | 8/2005 | Cho et al. | |
| 2005/0187657 A1 | 8/2005 | Hashimoto et al. | |
| 2005/0216120 A1 | 9/2005 | Rosenberg et al. | |
| 2005/0222690 A1 | 10/2005 | Wang et al. | |
| 2005/0231595 A1 | 10/2005 | Wang et al. | |
| 2005/0240958 A1 | 10/2005 | Nguyen et al. | |
| 2006/0038114 A9 | 2/2006 | Cofer et al. | |
| 2006/0085158 A1 | 4/2006 | Cakiner | |
| 2006/0167580 A1 | 7/2006 | Whittier | |
| 2006/0184379 A1 | 8/2006 | Tan et al. | |
| 2006/0195384 A1 | 8/2006 | Bauer et al. | |
| 2006/0229108 A1 | 10/2006 | Gehelnik | |
| 2006/0235747 A1 | 10/2006 | Hammond et al. | |
| 2006/0279307 A1 | 12/2006 | Wang et al. | |
| 2006/0280356 A1 | 12/2006 | Yamagishi | |
| 2007/0057815 A1 | 3/2007 | Foy et al. | |
| 2007/0129906 A1 | 6/2007 | Stoecker et al. | |
| 2007/0133844 A1 | 6/2007 | Waehner et al. | |
| 2007/0140310 A1 | 6/2007 | Rolton et al. | |
| 2007/0150403 A1 | 6/2007 | Mock et al. | |
| 2007/0205751 A1 | 9/2007 | Suzuki et al. | |
| 2007/0263099 A1 | 11/2007 | Motta et al. | |
| 2007/0276911 A1 | 11/2007 | Bhumkar et al. | |
| 2007/0281734 A1 | 12/2007 | Mizrachi | |
| 2008/0004828 A1 | 1/2008 | Mizrachi | |
| 2008/0027581 A1 | 1/2008 | Saether et al. | |
| 2008/0033596 A1 | 2/2008 | Fausak et al. | |
| 2008/0097770 A1 | 4/2008 | Low et al. | |
| 2008/0109746 A1 | 5/2008 | Mayer | |
| 2008/0111989 A1 | 5/2008 | Dufour et al. | |
| 2008/0149720 A1 | 6/2008 | Colville et al. | |

(56) References Cited

U.S. PATENT DOCUMENTS

| | | |
|---|---|---|
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0247133 A1 | 10/2009 | Holmen et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0051695 A1 | 3/2010 | Yepez et al. |
| 2010/0063894 A1 | 3/2010 | Lundy et al. |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0161397 A1 | 6/2010 | Gauthier et al. |
| 2010/0169231 A1 | 7/2010 | Bowles et al. |
| 2010/0219234 A1 | 9/2010 | Forbes |
| 2010/0228676 A1* | 9/2010 | Librizzi et al. ............... 705/306 |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0060641 A1 | 3/2011 | Grossman et al. |
| 2011/0067520 A1 | 3/2011 | Ihrke et al. |
| 2011/0235853 A1 | 9/2011 | Bowles et al. |
| 2012/0016518 A1 | 1/2012 | Saario et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0078413 A1 | 3/2012 | Baker et al. |
| 2012/0117001 A1 | 5/2012 | Gventer et al. |
| 2012/0146956 A1 | 6/2012 | Jenkinson |
| 2012/0191562 A1 | 7/2012 | Bowles et al. |
| 2012/0254046 A1 | 10/2012 | Librizzi et al. |
| 2012/0280934 A1 | 11/2012 | Ha et al. |
| 2012/0301009 A1 | 11/2012 | Dabic |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0144797 A1 | 6/2013 | Bowles et al. |
| 2013/0173434 A1 | 7/2013 | Hartman |
| 2013/0198089 A1 | 8/2013 | Bowles |
| 2013/0198144 A1 | 8/2013 | Bowles |
| 2013/0226679 A1 | 8/2013 | Bowles |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0012643 A1 | 1/2014 | Behrisch |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0156883 A1 | 6/2014 | Bowles |
| 2014/0214505 A1 | 7/2014 | Shuster-Arechiga et al. |
| 2015/0066677 A1 | 3/2015 | Bowles et al. |
| 2016/0284019 A1 | 9/2016 | Bowles et al. |
| 2016/0328684 A1 | 11/2016 | Bowles et al. |

FOREIGN PATENT DOCUMENTS

| | | |
|---|---|---|
| CN | 1864088 | 11/2006 |
| CN | 1957320 | 5/2007 |
| CN | 200965706 Y | 10/2007 |
| CN | 102246384 | 11/2011 |
| CN | 202351953 U | 7/2012 |
| CN | 202394296 U | 8/2012 |
| CN | 102654927 A | 9/2012 |
| CN | 102812500 | 12/2012 |
| CN | 102930642 A | 2/2013 |
| CN | 102976004 A | 3/2013 |
| CN | 103198562 A | 7/2013 |
| CN | 103226870 A | 7/2013 |
| CN | 203242065 U | 10/2013 |
| CN | 103440607 A | 12/2013 |
| CN | 103544772 A | 1/2014 |
| CN | 203408902 U | 1/2014 |
| CN | 103662541 A | 3/2014 |
| CN | 103679147 A | 3/2014 |
| CN | 203520502 U | 4/2014 |
| CN | 203588366 U | 5/2014 |
| EP | 1168253 A1 | 1/2002 |
| EP | 1703436 A2 | 9/2006 |
| JP | 07-112801 | 5/1995 |
| JP | H07334583 A | 12/1995 |
| JP | 2000-121564 A | 4/2000 |
| JP | 2002-019147 A | 1/2002 |
| JP | 2002183286 A | 6/2002 |
| JP | 2002-259528 A | 9/2002 |
| JP | 2002302252 A | 10/2002 |
| JP | 2002324264 A | 11/2002 |
| JP | 2002358354 A | 12/2002 |
| JP | 2003139516 | 5/2003 |
| JP | 2003230229 | 8/2003 |
| JP | 2003242243 A | 8/2003 |
| JP | 2003-267509 A | 9/2003 |
| JP | 2003264007 A | 9/2003 |
| JP | 2004021569 A | 1/2004 |
| JP | 2004-303102 A | 10/2004 |
| JP | 2004288143 A | 10/2004 |
| JP | 2004341681 A | 12/2004 |
| JP | 2006127308 A | 5/2006 |
| JP | 2006195814 A | 7/2006 |
| JP | 2006227764 A | 8/2006 |
| JP | 2006260246 A | 9/2006 |
| JP | 2007141266 A | 6/2007 |
| JP | 2007155455 | 6/2007 |
| JP | 2007179516 A | 7/2007 |
| JP | 2007-265340 A | 10/2007 |
| JP | 2008522299 A | 6/2008 |
| JP | 2008293391 A | 12/2008 |
| JP | 2007-086725 | 4/2009 |
| JP | 2009245058 A | 10/2009 |
| JP | 2009250971 | 10/2009 |
| JP | 2010177720 A | 8/2010 |
| JP | 2012058932 A | 3/2012 |
| JP | 2013033361 A | 2/2013 |
| JP | 2013037441 A | 2/2013 |
| JP | 2013551823 | 8/2013 |
| KR | 20000064168 | 11/2000 |
| KR | 20130085255 A | 7/2013 |
| KR | 20140037543 A | 3/2014 |
| WO | 0115096 A1 | 3/2001 |
| WO | WO-01/15096 A1 | 3/2001 |
| WO | 0205176 A1 | 1/2002 |
| WO | WO-0239357 A1 | 5/2002 |
| WO | WO-03012717 A1 | 2/2003 |
| WO | WO-03014994 A1 | 2/2003 |
| WO | WO-2004021114 A2 | 3/2004 |
| WO | 2004114490 A1 | 12/2004 |
| WO | 2005008566 A1 | 1/2005 |
| WO | WO-2005101346 A1 | 10/2005 |
| WO | 2006058601 A1 | 6/2006 |
| WO | WO-2006080851 A2 | 8/2006 |
| WO | 2009128173 | 10/2009 |
| WO | 2009129526 A1 | 10/2009 |
| WO | WO-2010040116 A1 | 4/2010 |
| WO | WO-2010128267 A1 | 11/2010 |

(56) References Cited

FOREIGN PATENT DOCUMENTS

| WO | WO-2010128315 A1 | 11/2010 |
|---|---|---|
| WO | WO-2011131016 A1 | 10/2011 |
| WO | WO-2012/138679 A1 | 10/2012 |
| WO | WO-2013074819 A1 | 5/2013 |

OTHER PUBLICATIONS

PCT International Search Report for PCT Application No. PCT/US2011/028251, Intl. Filing Date Mar. 13, 2011.
Rolf Steinhilper, "Remanufacturing: The Ultimate Form of Recycling", Fraunhofer IRB Verlag, 1998, parts 1-3, http://www.reman.org/Publications_main.htm.
PCT International Search Report and Written Opinion for PCT Application No. PCT/US09/59461, Intl. Filing Date Oct. 2, 2009.
Intl. Search Report and Written Report for PCT/US2013/023717 filed Jan. 30, 2013.
Aftermarket Cellular Accessories, "Cellular Phone Model Identification," retrieved from http://web/archive.org/web/200603228064957/http://aftermarketcellular.com/ic/identification.html on Mar. 16, 2014, published Mar. 28, 2006, pp. 3.
Altec Lansing User's Guide 2007, 8 pages.
Business Wire, "The World's First Office Photography Machine" at CES 2008 Launched by Ortery technologies, Jan. 7, 2008, 3 pages.
Evgenii Masunov, Mar. 25, 2010, http://www.appleinsider.ru/news/ipone-obladaet-luchshim-tachskrinom-provereno_robotom.html, 4 pages.
Examination Report for Canadian Application No. 2,739,633, dated Dec. 6, 2013, 3 pages.
International Numbering Plan, www.numberingplans.com, 2 pages.
Office Action dated Apr. 8, 2013 for Chinese Application No. 200980148240.3, 12 pages.
Office Action dated Jan. 13, 2014 for Chinese Application No. 200980148240.3, 13 pages.
Office Action dated Aug. 6, 2013 in Japanese Patent Application No. 2011530284, 7 pages.
Office Action dated Jul. 1, 2014 in Japanese Patent Application No. 2011530284, 4 pages.
Office Action dated Sep. 3, 2012 in European Patent Application No. 09818605.9, 7 pages.
PCT International Search Report and Written Opinion dated Apr. 3, 2014 for PCT/US2013/072697 filed Dec. 2, 2013, 7 pages.
PCT International Search Report and Written Opinion dated Jul. 18, 2014 for PCT Application No. PCT/US2014/024551, filed Mar. 12, 2014, 11 pages.
Rawson, Chris, "TUAW: 25 Ways to Check the Hardware on Your iPhone 4", published Aug. 13, 2010, retrieved at http://www.tuaw.com/2010/08/13/hardware-test-your-iphone-4/ on Feb. 28, 2014.
Yahoo! Answers, "What is a clean ESN?" published Jun. 23, 2009, retrieved from http://web.archive.org/web/2009062315042/http://answers.yahoo.com/question/inde,8020US?qid=20080318061012AANFRco on Apr. 3, 2014.
Co-pending U.S. Appl. No. 14/498,763, filed Sep. 26, 2014.
Co-pending U.S. Appl. No. 14/500,739, filed Sep. 29, 2014.
Co-pending U.S. Appl. No. 14/506,449, filed Oct. 3, 2014.
Co-pending U.S. Appl. No. 14/568,051, filed Dec. 11, 2014.
PCT International Search Report for PCT Application PCT/US2012/032042, Intl. Filing Date Apr. 4, 2012.
PCT International Search Report for PCT Application PCT/US2012/061587, Intl. Filing Date Oct. 24, 2012.
CNET, "Tackling LCD "burn ins", and dead/stick Pixels", published Sep. 2, 2009, retrieved from http://www.cnet.com/news/tackling-lcd-burn-ins-and-deadstuck-pixels/.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06×12×22.htm on Nov. 11, 2015.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
SimplySellular, "Get Cash for your Old Cell Phone", published Apr. 2, 2010, retrieved from http://simplysellular.com/conditions.php on Jan. 6, 2015, 2 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
GSM Arena Glossary, "LCD (Liquid Crystal Display", retrieved from http://www.gsmarena.com/glossary.php3?term=lcd on Apr. 28, 2016, 1 page.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
2006 Florida Statutes Title XXXIII, Chapter 538, Sections 538.03 and 538.04, 7 pages.
Co-Pending U.S. Appl. No. 15/672,157, filed Aug. 8, 2017
Notice of Allowance dated Sep. 27, 2017 in U.S. Appl. No. 15/641,122, 5 pages.
Office Action dated Sep. 1, 2017 in U.S. Appl. No. 15/630,460, 23 pages.
Office Action dated Sep. 5, 2017 in U.S. Appl. No. 15/641,122, 7 pages.
Office Action dated Sep. 1, 2017 in U.S. Appl. No. 15/641,145, 20 pages.
Office Action dated Oct. 10, 2017 in U.S. Appl. No. 15/672,157, 18 pages.
Co-Pending U.S. Appl. No. 15/630,460, filed Jun. 22, 2017.
Co-Pending U.S. Appl. No. 15/641,122, filed Jul. 3, 2017.
Co-Pending U.S. Appl. No. 15/641,145, filed Jul. 3, 2017.
Decision of Rejection dated Nov. 26, 2015 in China Application No. 201390000953.7, 6 pages.
Decision of Rejection dated Nov. 3, 2016 in China Application No. 201180014870.97, 13 pages.
Examination Report for Canadian Application No. 2,792,057, dated Dec. 2, 2016, 4 pages.
Examination Report for Canadian Application No. 2,926,097, dated Jun. 5, 2017, 3 pages.
Examination Report for Canadian Application No. 2903502, dated Nov. 16, 2016, 4 pages.
Examination Report for European Application No. 12768387.8, dated Jan. 2, 2017, 5 pages.
Examination Report dated Sep. 16, 2015 in Canadian Application No. 2,861,423, 4 pages.
Extended European Search Report dated Feb. 27, 2015 in European Application No. 11756778.4, 12 pages.
Extended European Search Report dated Jul. 30, 2015 in European App. No. 12843702, 12 pages.
Extended European Search Report dated Jun. 18, 2015 in European Application No. 13744249.7, 8 pages.
Extended European Search Report dated Oct. 31, 2016 in European Application No. 14779835.9, 8 pages.
Extended European Search Report dated Sep. 3, 2012 in European App. No. 09818605.9, 7 pages.
Final Office Action dated Jul. 11, 2017 in U.S. Appl. No. 13/438,924, 19 pages.
Notice of Allowance dated Jul. 5, 2017 in U.S. Appl. No. 13/862,395, 9 pages.
Office Action dated Apr. 9, 2014 in U.S. Appl. No. 13/862,395, 26 pages.
Office Action dated Aug. 11, 2015 in China Application No. 201410698441.3, 15 pages.

(56) References Cited

OTHER PUBLICATIONS

Office Action dated Aug. 26, 2015 in China Application No. 201380006385.6, 15 pages.
Office Action dated Feb. 15, 2016 in China Application No. 201180014870.9, 17 pages.
Office Action dated Feb. 22, 2017 in Japanese Patent Application No. 2014-555634, 11 pages.
Office Action dated Feb. 25, 2016 in U.S. Appl. No. 13/794,816, 76 pages.
Office Action dated Jul. 11, 2016 in U.S. Appl. No. 13/794,814, 21 pages.
Office Action dated Jul. 17, 2017 in China Application No. 201510505807.5, 36 pages.
Office Action dated Jul. 20, 2015 in China Application No. 201180014870.9, 12 pages.
Office Action dated Jul. 29, 2013 in U.S. Appl. No. 13/862,395, 19 pages.
Office Action dated Mar. 14, 2016 in Japanese Application No. 2014-503922, 11 pages.
Office Action dated Mar. 15, 2016 in China Application No. 201280027565.8, 12 pages.
Office Action dated Mar. 3, 2017 in U.S. Appl. No. 13/913,408, 29 pages.
Office Action dated Mar. 6, 2015 in U.S. Appl. No. 13/862,395, 29 pages.
Office Action dated May 2, 2017 in China Application No. 201510556608.7, 12 pages.
Office Action dated May 20, 2016 in China Application No. 201410698441.3., 11 pages.
Office Action dated May 22, 2017 in China Application No. 201510556456.0, 29 pages.
Office Action dated May 31, 2016 in U.S. Appl. No. 13/658,828, 63 pages.
Office Action dated May 8, 2017 in China Application No. 201280027565.8, 35 pages.
Office Action dated Nov. 2, 2016 in China Application No. 201510505807.5, 26 pages.
Office Action dated Nov. 4, 2014 in China Application No. 201180014870.9, 9 pages.
Office Action dated Sep. 18, 2015 in U.S. Appl. No. 13/862,395, 29 pages.
Office Action dated Sep. 29, 2016 in China Application No. 201280027565.8, 36 pages.
RMS Communications Group, "RMS Communications Group Inc. opens cell phone kiosk at Ocean City Mall in Toms River, N.J.", retrieved from http://www.prweb.com/releases/2004/11/prweb177351.htm, dated Nov. 12, 2004, 2 pages.

\* cited by examiner

MINI-KIOSK FOR RECYCLING ELECTRONIC DEVICES

CROSS REFERENCES TO RELATED APPLICATIONS

The Present Application is a continuation-in-part application of U.S. patent application Ser. No. 13/438924, filed on Apr. 4, 2012, which claims priority to U.S. Provisional Patent Application 61/472611, filed on Apr. 6, 2011, now abandoned, and is also a continuation-in-part application of U.S. patent application Ser. No. 12/785465 filed on May 23, 2010, now U.S. Pat. No. 8,200,533, which is a continuation-in-part application of U.S. patent application Ser. No. 12/727624, filed on Mar. 19, 2010, now U.S. Pat. No. 7,881,965, which issued on Feb. 1, 2011, which is a continuation-in-part application of U.S. patent application Ser. No. 12/573089, filed on Oct. 2, 2009, which claims priority to U.S. Provisional Patent Application 61/102304 filed on Oct. 2, 2008, now abandoned, and Ser. No. 61/183510 filed on Jun. 2, 2009, now abandoned, all of which are herein incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to recycling of consumer electronic devices.

Description of the Related Art

There has been a large increase in the number of electronic devices used by the typical consumer. These devices include cell phones, PDA's, MP3 players, GPS devices, cameras, beepers, remote controls, cordless phones, calculators, etc. The rapid pace at which new technology and models of electronic devices are introduced creates a situation where many consumers upgrade or replace one or more recyclable device on a frequent basis. Often, the consumer does not dispose of the prior electronic device, but rather just stops using it and begins using the new device. This may happen over several generations of such devices.

In addition to the electronic devices mentioned above, there are many other types of devices that have relatively high frequency replacement rates, including portable mobile electronic devices, such as cell phones, MP3 players, etc, and non-portable electronic devices, such as computers, printers, and the like. In addition to electronic devices, there are content based digital media such as games on CD, DVD, or cartridge, or entertainment mass storage items such as CDs, DVDs, BluRay, etc. There is a need for handling of such items in an ecologically friendly manner, both via recycling or by proper disposal procedures. It has not been convenient for owners of electronic devices to either recycle such devices or to properly dispose of such devices. There is currently little incentive for a device owner to "do the right thing" with a used device. When the owner just stops using a device and simply puts it in storage: the opportunity for recycling or re-use by another party is lost. If the owner just throws the device away in normal trash containers, the proper recycling or safe disposing of the device is thwarted.

One particular problem associated with this phenomenon can be illustrated by an example of mobile phones. There are more than 3.6 billion mobile phone users in the world with an annual growth of 10% per annum. The replacement rate of mobile handsets is roughly every 18 months as new models have more features and new standards evolve. Wireless carriers also offer new phones below cost, or free, as incentives to get customers to sign lucrative two-year service contracts ensuring a constant build-up of old mobile phones. Old mobile phones and other mobile devices (pagers, PDAs) present a growing threat to the environment. As of 2007, there are more than 750 million mobile phones waiting to be recycled in the US, either in drawers or already in the waste stream. Another 150+ million or so are added every year. Once in the waste stream, these devices may leak Lead, Mercury, Cadmium, Arsenic and other toxic substances into the water supply. Municipalities often incinerate their waste, instantly putting these toxic elements into the air, and they return to earth in rain water. A problem that needs to be solved is to make it easy and accessible for the public to recycle or resell their mobile phones and other recyclable devices. Two reasons why mobile phones are not being recycled or resold are difficult access to recycling or reselling facilities, and secondly security concerns about the information stored on the mobile phone. In addition to mobile phones, the same problems apply to many other electronic devices.

Technology has not yet provided a resolution to this problem. One invention is Bishop, U.S. Pat. No. 4,951,308 for Automated Vending Of Cellular Hand-Held Telephones And Cellular Telephone Services, which discloses a vending machine that dispenses cellular telephones purchased by consumers through the vending machine. Bishop essentially adds to the problem by making it easier to acquire mobile phones.

Taylor et al., U.S. Patent Publication Number 2009/0190142, for a Method And System For Connecting A Data Storage Device To A Mini-kiosk, discloses a mini-kiosk with a docking port and an optical recognition device for identifying a data port on a data storage device. Taylor is directed at printing digital images at a photo mini-kiosk.

The prior art has failed to recognize the problems associated with recycling mobile phones in a manner that is enticing to a consumer yet financially rewarding to the recycler.

BRIEF SUMMARY OF THE INVENTION

The present invention is a mini-kiosk that can be placed on a counter-top and enables one to securely recycle, donate, trade-in, and/or sell electronic devices in a publicly accessible location.

One aspect of the present invention is a mini-kiosk for recycling electronic devices such as mobile phones, tablet computes. e-readers, MP3 players, and the like. The mini-kiosk preferably has a housing with a touch screen display for user interaction. The mini-kiosk also has an inspection area with mirrors on interior surfaces along with imaging components such as cameras in order to obtain multi-angled views, or even a 3-D profile, of an electronic device within the inspection area. The mini-kiosk also preferably has a removable lock box for binning the electronic device. The mini-kiosk also has a processor configured to perform visual analysis for identification of the electrical device and to determine a condition of the electrical device, especially a LCD display of the electronic device. Further, the processor is configured to perform an electrical analysis of the electronic device. In another aspect, an apparatus in accordance with a particular embodiment includes an upper chamber camera, a lower chamber camera, and the plurality of mirrors that allow for obtaining a 360 degree view of an electronic device placed on a rotatable transparent plate.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
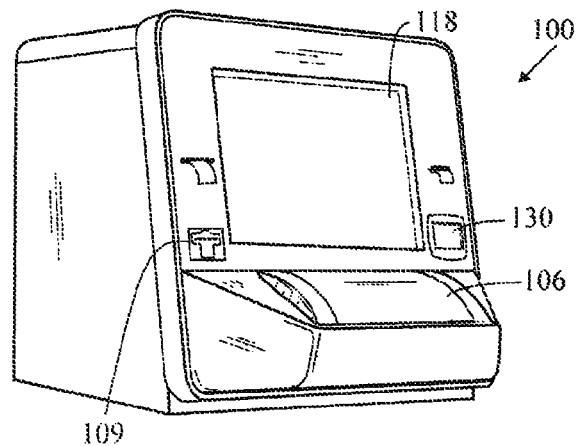
FIG. 1 is a perspective view of a mini-kiosk for recycling electronic devices.
Figure 1A:
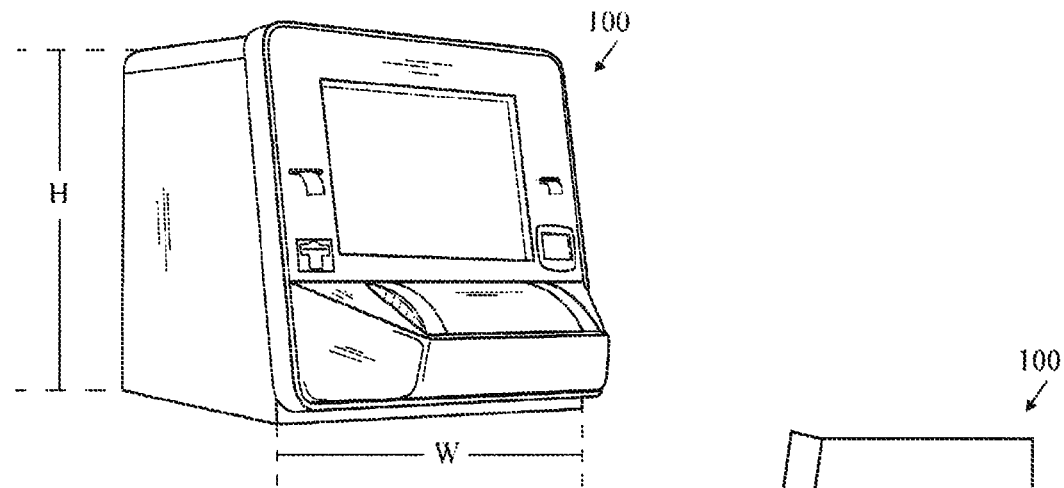
FIG. 1A is a perspective view of the recycling kiosk of FIG. 1.
Figure 1B:
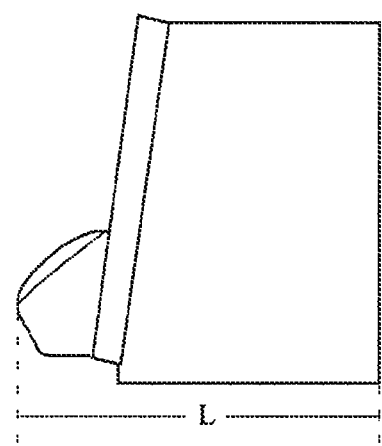
FIG. 1B is a side view of the recycling mini-kiosk of FIG. 1.

As shown in FIGS. 1, 1A and 1B, a mini-kiosk for recycling electronic devices and providing financial remuneration is generally designated 100. The mini-kiosk 100 is preferably sized for placement on a counter-top. The mini-kiosk 100 preferably has a mass ranging from 2 kilogram to 50 kilograms, more preferably a mass ranging from 2 kilogram to 25 kilograms, and even more preferably ranging from 2 kilogram to 5 kilograms. A housing of the mini-kiosk 100 is preferably composed of an aluminum material, a composite material, glass, plastic, tin, titanium, a magnesium alloy, or combinations of the afore-mentioned materials. The mini-kiosk 100 preferably has a length, L, ranging from 20 centimeters to 100 centimeters, a width, W, ranging from 20 centimeters to 100 centimeters, and a height, H, ranging from 20 centimeters to 100 centimeters. The mini-kiosk 100 more preferably has a length, L, ranging from 30 centimeters to 50 centimeters, a width, W, ranging from 30 centimeters to 50 centimeters, and a height, H, ranging from 30 centimeters to 50 centimeters. The mini-kiosk 100 preferably has a volume no greater than one cubic meter.

The electronic device may be a Smart Phone, mobile phone, tablet computer, IPOD® device, MP3 Player, GPS device, e-reader, etc. A housing of the mini-kiosk 100 has a pseudo-rectangular cube shape. An access door in a front body area of the housing provides access to an inspection area 106 for electronic devices. The front of the housing has a display screen 118 for providing information to a user, and acts as a user interface in a touch screen embodiment. The exterior of the housing also preferably has at least one of a label printer, a voucher dispenser, a receipt printer, and a cash or card dispenser. The exterior housing may also have a thumbprint reader 130 and an identification verification slot 109.

The mini-kiosk 100 allows for automatic visual analysis of an electronic device to identify the electronic device and to determine electronic device is damaged in order to ascertain a value for recycling the electronic device. Further, the mini-kiosk 100 also allows for electrical analysis of the electronic device.

Figure 2:
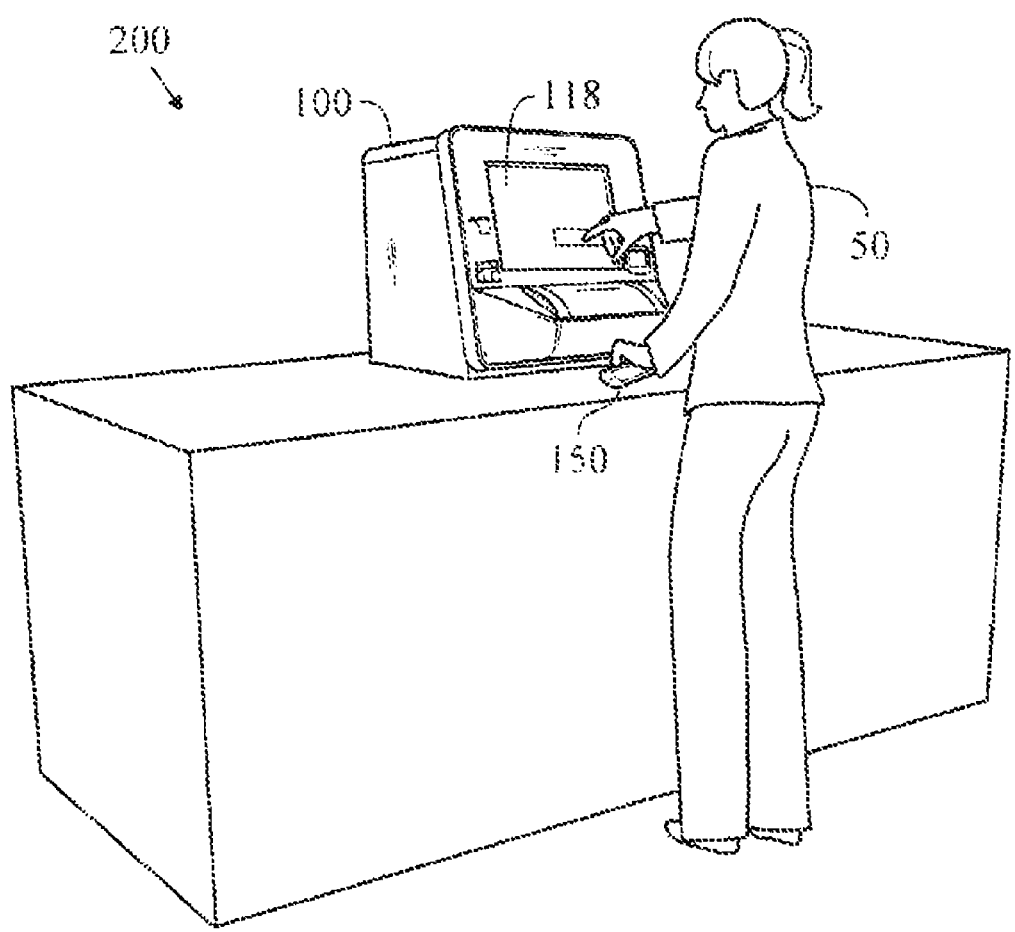
FIG. 2 is an illustration of a mini-kiosk for recycling electronic devices on a counter-top with an operator present to assist with the recycling process.

As shown in FIG. 2, the mini-kiosk is preferably placed on a counter-top of a retail store 200. In one embodiment, an operator 50 places an electronic device 150 into the inspection area 106 of the mini-kiosk 100.

The mini-kiosk 100 preferably comprises a plurality of electrical connectors 505. Each of the electrical connectors 505 has a unique connection plug for removable connection to an electronic device.

Figure 3:
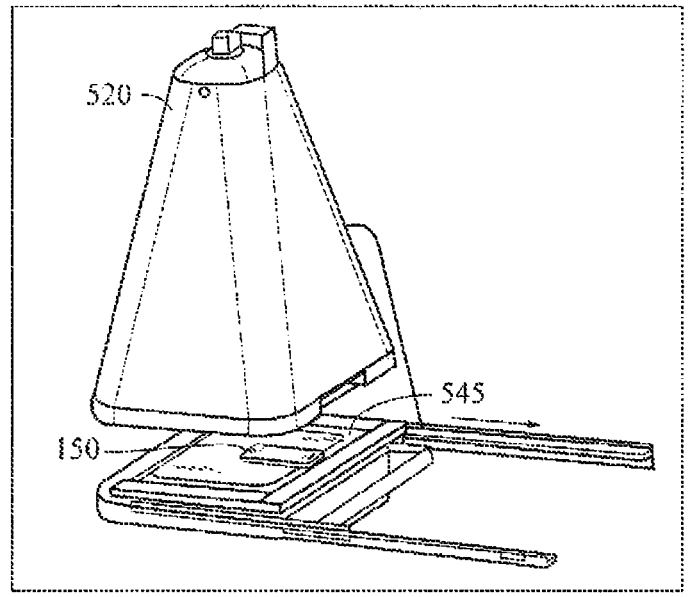
FIG. 3 is a perspective view of internal components of a mini-kiosk.
Figure 4:
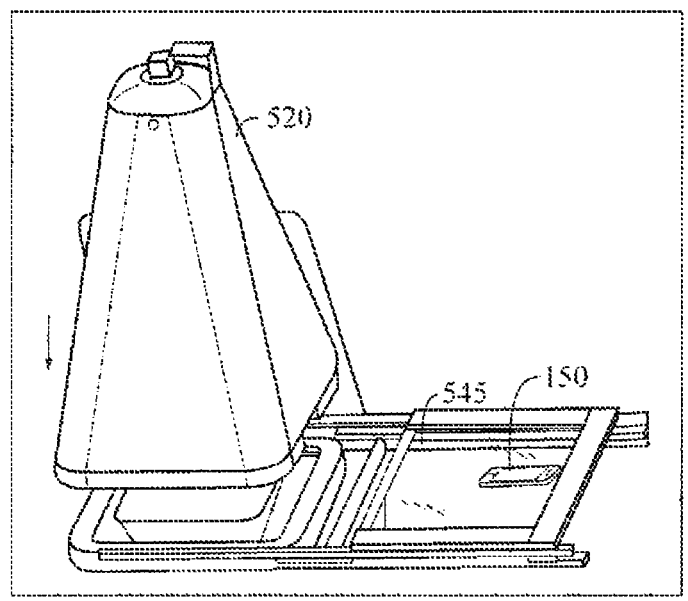
FIG. 4 is an isolated view internal components of a mini-kiosk with a phone on an inspection plate.

As shown in FIGS. 3 and 4, the internal mechanism 101 of the mini-kiosk 100 includes a chamber 520 and a transparent plate 545. As shown in FIG. 4, a mobile phone 150 is placed on the transparent plate 545 and transferred within the inspection area 106 to the chamber 520. The chamber preferably has a bell-like shape. The mobile phone 150 is moved within the chamber 520 for visual analysis. The transparent plate, preferably composed of glass of a transparent plastic material, allows for imaging components within the chamber 520 to obtain multiple view images of the mobile phone 150. Preferably, a 3-D profile of the mobile phone 150 is generated in order to provide visual analysis for identification and condition of the mobile phone 150. Once the visual analysis is complete, the transparent plate 545 moves out from the chamber 520.

The inspection area 106 is preferably designed to permit a detailed visual inspection of an electronic device such as a mobile phone, tablet computer, e-reader, MP3 players, PDA. The walls of the inspection area are preferably white and/or mirrored to provide imaging of the electronic device.

The couplings from the mini-kiosk 100 and to a remote computer are preferably a single coupling to a communications network such as the internet via wired LAN, wireless LAN, cellular or any other proprietary communications system. The Mini-kiosk 100 preferably includes a processor 160 for processing the information obtained from the mobile phone and for controlling the components of the mini-kiosk 100. Preferably, the processor 160 is a standard personal computer ("PC") or other type of embedded computer running any operating system such as Linux or MAC OS. The processor 160 is most preferably a small form factor PC with integrated hard disk drive ("HDD"), central processing unit ("CPU") and universal serial bus ("USB") ports to communicate with the other components of the mini-kiosk 100. One most preferred CPU is a DELL PC OPTIPLEX 780. Alternatively, the processing means is a microprocessor with a standalone motherboard which interfaces to a discrete HDD, power supply and the other components of the mini-kiosk 100. The mini-kiosk 100 preferably includes a memory 161 or other storage device, such as a disk drive, that stores the executable applications, test software, databases and other software required to operate the recycling mini-kiosk 100.

The external communication component for the mini-kiosk 100 preferably includes a wired Ethernet to provide connection to the internet, or alternatively the external communication component includes a wireless modem such as GSM, CDMA, 3G and 4G technologies for data communications.

Figure 7:
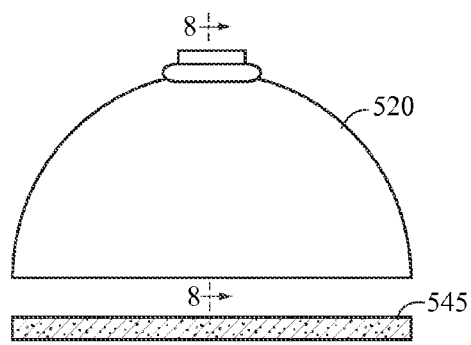
FIG. 7 is an isolated view of an inspection area of a mini-kiosk.
Figure 7:
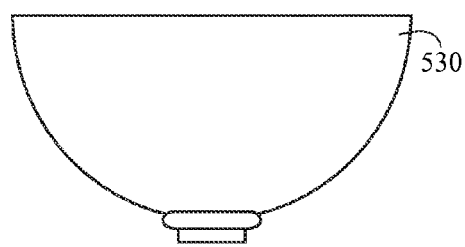
Figure 8:
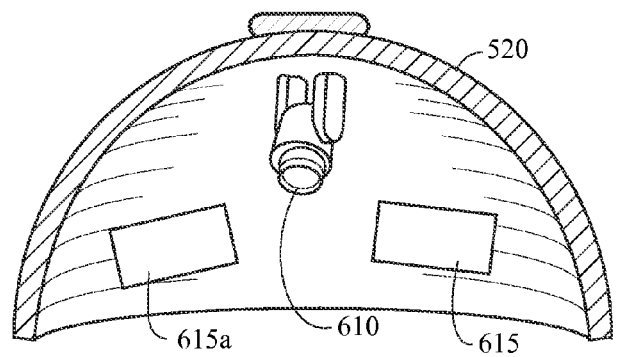
FIG. 8 is an isolated view of a camera in a dome of a mini-kiosk.
Figure 9:
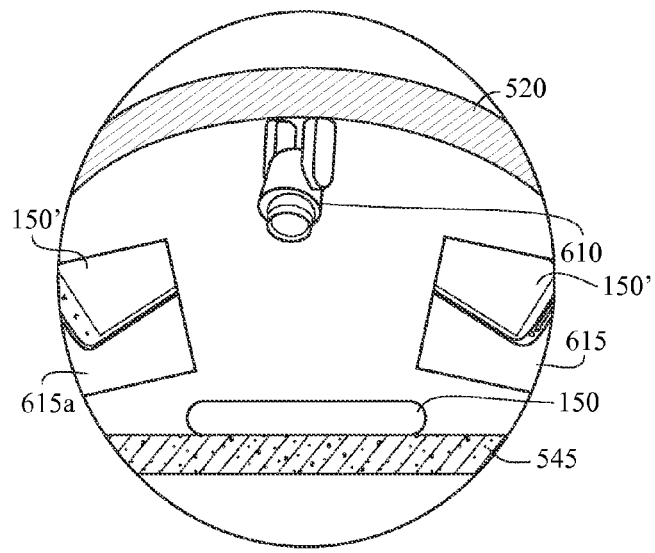
FIG. 9 is an isolated view of a phone in an inspection area of a mini-kiosk.
Figure 10:
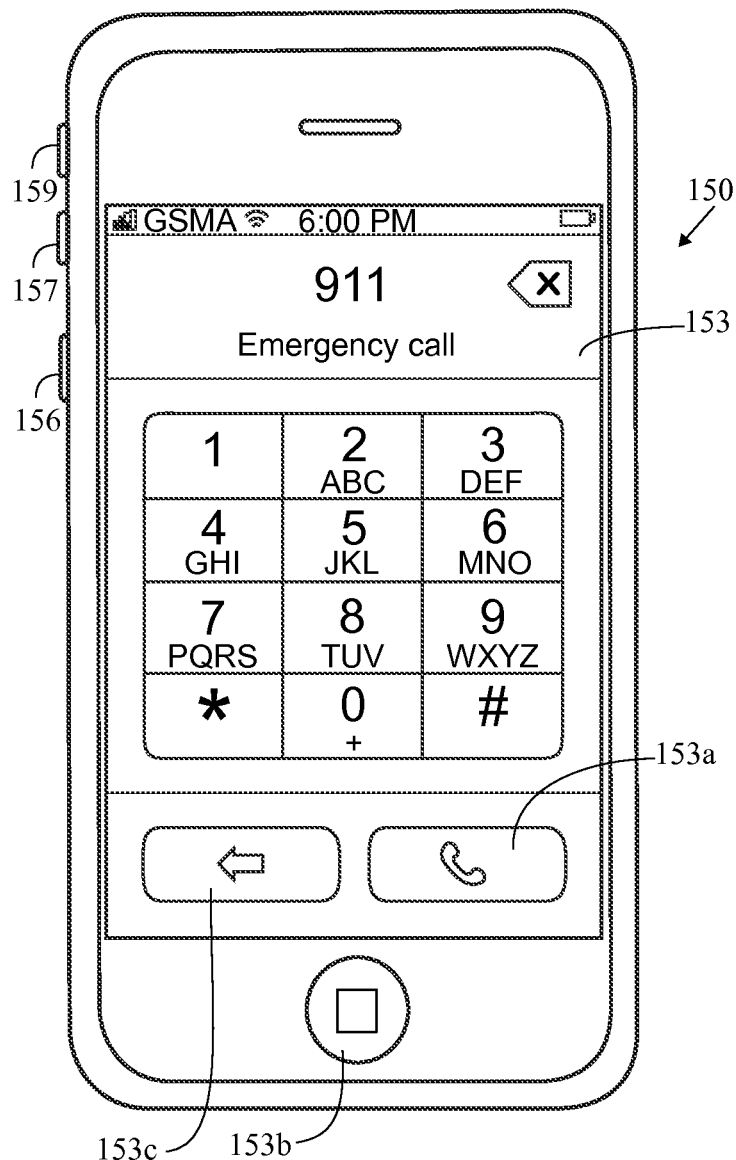
FIG. 10 is a front view of a phone.
Figure 11:
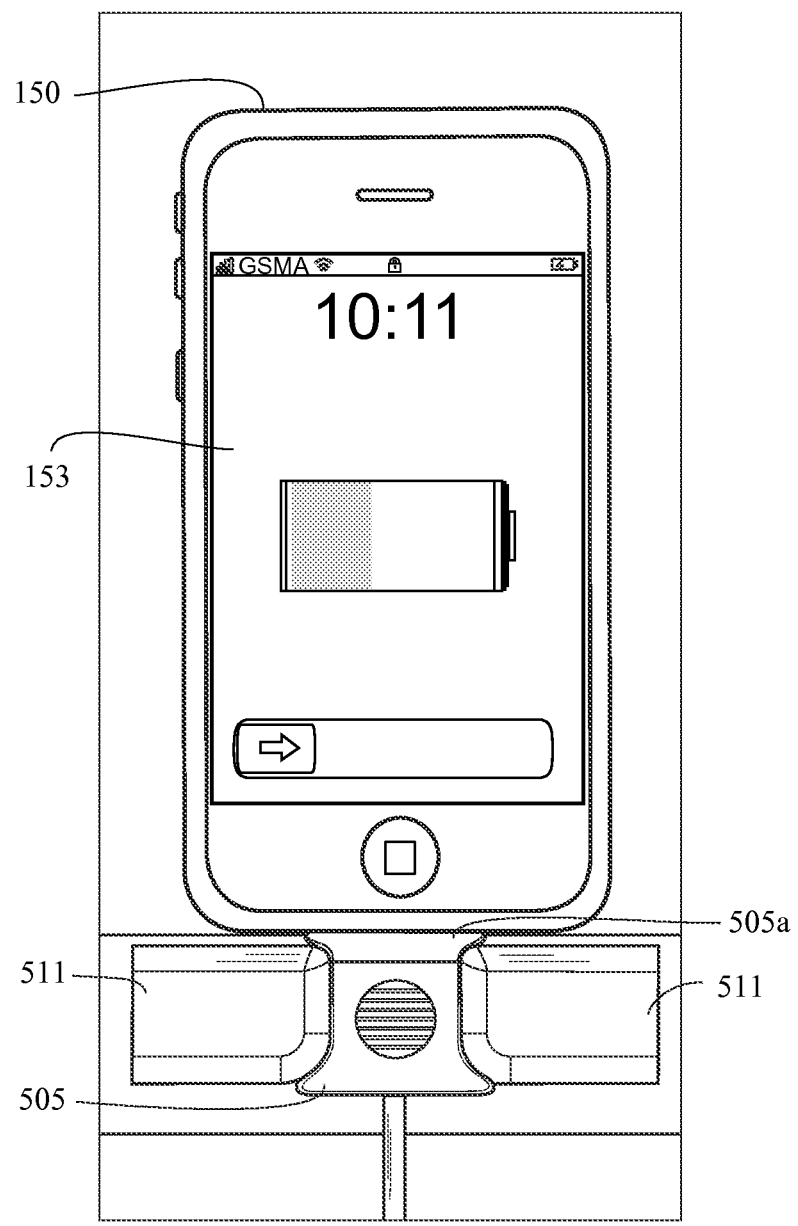
FIG. 11 is a front view of a phone connected to an electrical connector.

An alternative embodiment of the inspection area is shown in FIGS. 7-9. The visual inspection of an electronic device such as a mobile phone 150 in the inspection area 106 is preferably performed by at least one camera 610 within an upper chamber 520. A lower chamber 530 also preferably has at least one camera or other imaging component such as a scanner. Alternatively, the visual inspection is performed by multiple cameras. A preferred camera 610 is a 1 megapixel machine vision camera. If a single camera 610 is utilized in the inspection area 106, the camera 610 preferably is movable to increase a field of view of the inspection area 106 to inspect the electronic device 150 such as a mobile phone placed on the transparent plate 545. The camera 161 is preferably movable. Preferably the camera 610 is positioned to image a LCD screen 153 of the electronic device 150 to determine if the LCD screen 153 is damaged. The interior surfaces of the upper chamber 520 and lower chamber 530 preferably include mirrors 615 in order to optimize viewing of an electronic device positioned within the inspection area 106. As shown in FIG. 9, a reflection 150' of a mobile phone 150 is illustrated. The camera 610 is also preferably movable to image a data port of the electronic device to determine the type of electrical connector 505 for the electronic device in order to perform an electrical analysis of the electronic device. Alternatively, the entire interior surfaces of the upper chamber 520 and the lower chamber 530 are mirrored for optimization of imaging of the electronic device. The camera(s) alternatively are CCD or CMOSS.

Also, time is of the essence when inspecting the electronic device. The analysis is completed within an illumination period of the electronic device, wherein the illumination device comprises the time from when the display screen of the electronic device is illuminated to the time the display screen converts to an energy conserving mode, evidences by the screen blacking out. During the inspection, the brightness of the illumination is also measured. The lighting preferably comprises LED based lighting with beam splitters, or alternatively UV lighting.

The transparent plate optionally operates as a weight scale to obtain a mass of the electronic device for use in determining a remuneration value. For example, if the mass of the electronic device 150 is less than set forth in a vendor specification for the electronic device, then one or more components of the electronic device may be missing, such as the battery for the electronic device 150.

Preferably, visual inspection and recognition software is utilized by the mini-kiosk 100 to analyze an electronic device. In one preferred method, a recognition algorithm is applied to a specific make and model of an electronic device. The visual inspection and recognition software determines the borders of an electronic device 150 under inspection to determine the external dimensions of the electronic device 150. The external dimensions are utilized to determine a subset of possible mobile phones from a master database of mobile phones stored in the memory 161 of the mini-kiosk 100 or available online to the mini-kiosk 100 using external communications. The visual inspection and recognition software then preferably uses a set of secondary and tertiary features to further distinguish the electronic device 150. These secondary and tertiary features can include placement and size of the display screen, placements and size of the keyboard, unique buttons, placement of ports, and other distinguishing features. Once an exact make and model of the electronic device is determined, the visual inspection and recognition software subtracts an image of the electronic device 150 from an image of a perfect electronic device for the same make and model. The result of the subtraction is preferably a quantifiable number of pixels that are calibrated into categories of broken or missing parts, cracked screen, and low, medium or high wear.

Alternatively, the visual inspection is performed using neural network pattern recognition techniques to identify the mobile phone 150, then filter algorithms are utilized to determine defects such as cracked screens. Further, those skilled in the pertinent art will recognize that other visual inspection techniques may be employed without departing from the scope and spirit of the present invention.

The electrical analysis of an electronic device 150 is preferably performed using an electrical connector 505 connected to a data port of an electronic device 150. Once the make and model of the electronic device 150 is determined, either by visual inspection or user input using a user interface such as touch screen display 115, the correct electrical connector 505 is dispensed by the carousel 500 for connection to the data port of the electronic device 150. The connection of the electrical connector 505 to the electronic device 150 is preferably performed automatically by the mini-kiosk 100. Alternatively, the proper choice of electrical connector 505 is rotated into position on the carousel 500 and illuminated or in some other way presented to the consumer for manual connection of the electrical connector 505 to the data port of the electronic device 150. Electrical analysis software is preferably utilized by the mini-kiosk 100 to interact with the electronic device 150. The electrical analysis preferably determines if the mobile phone is capable of activation, maintaining a charge, performing correctly, powering a display screen of the electronic device 150, providing make, model, serial number and other pertinent information about the electronic device 150, and other relevant information.

The touch screen display 118 preferably includes a keypad, user selection buttons, soft keys, and other similar components. The touch screen display 118 is used to enable quick and easy access to various features and functions of the recycling mini-kiosk 100. The recycling mini-kiosk 100 preferably dispenses various forms of payment, including cash, credit cards, debit cards, chip cards, gift cards from the mini-kiosk's host location or other gift cards, and other magnetic striped cards or electronic payment methods. The mini-kiosk 100 also uses the barcode reader to read the barcode identification on the inside of the battery pack. A UV detector is used for reading "invisible" barcodes in use by certain vendors such as Apple and others. The bar code reader, camera, and/or UV detector of the mini-kiosk 100 is another technique used to identify the product model, IMEI #, and/or FCC ID. Alternatively, the mini-kiosk 100 communicates with the electronic device 150 using wireless communications to test and if necessary erase data from the electronic device 150.

Figure 5:
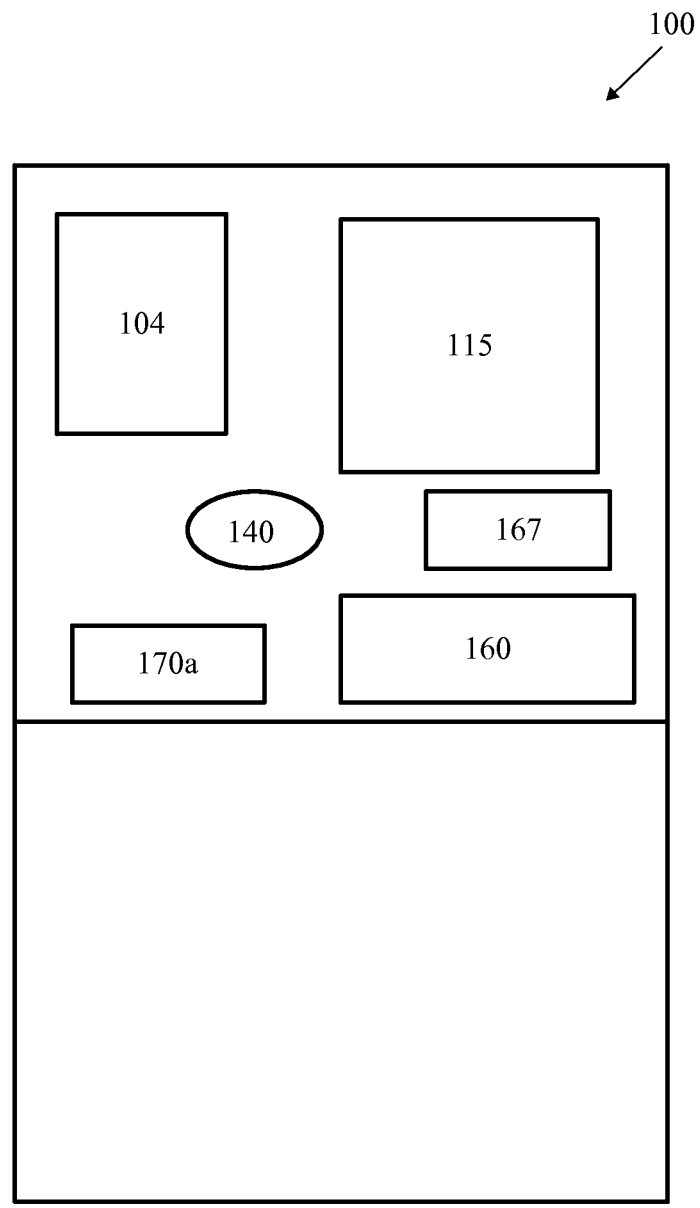
FIG. 5 is a block diagram of components of a mini-kiosk.
Figure 6:
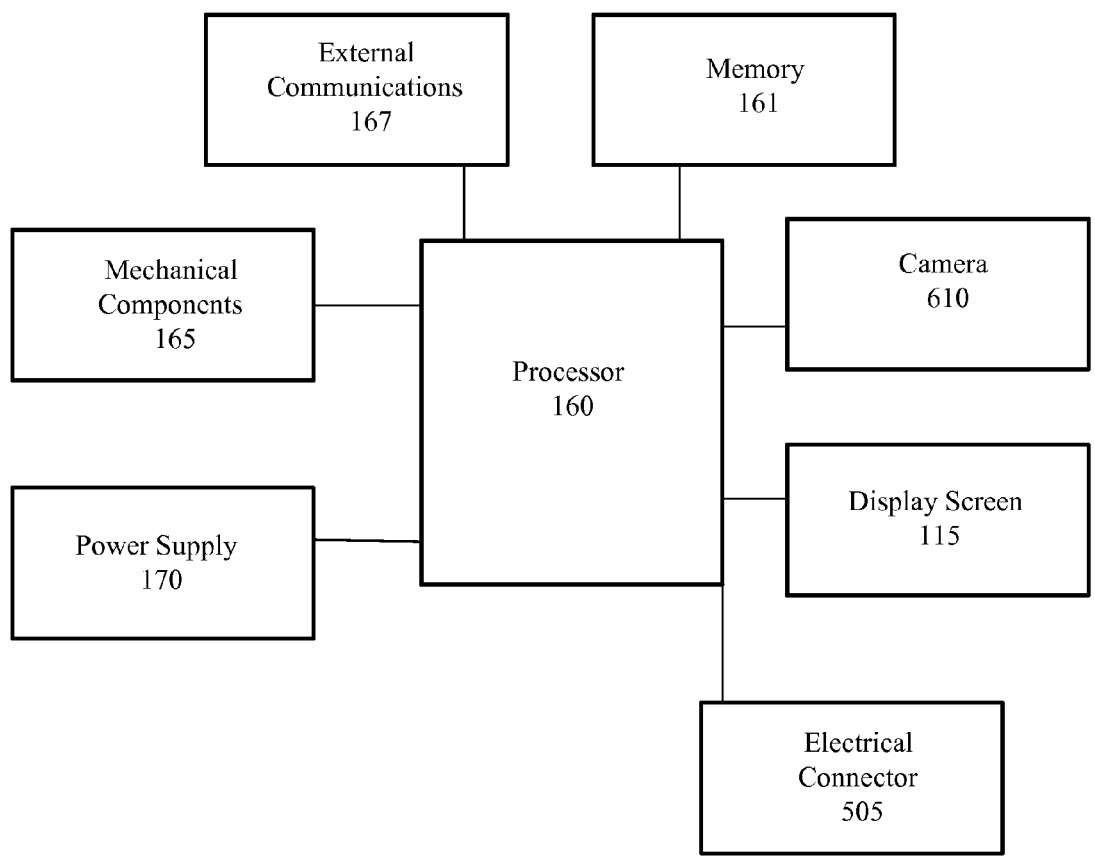
FIG. 6 is a block diagram of components of a mini-kiosk.

FIG. 6 is a block diagram of the main components of the mini-kiosk 100. A processor 160 is preferably in communication with the other components of the mini-kiosk 100. The memory 161 preferably contains a database of information on multiple mobile phones including images, physical characteristics, prices and other similar information. The external communications 167 preferably communicates through a wireless connection or Ethernet with a network to receive and transmit information to a remote site. The power supply 170 is preferably received through a plug-in connection to a wall outlet. The mechanical components 165 include the electrical connector carousel 500, the transparent plate 545, the binning plate 540, the door 550, and other similar components. The camera 610 or cameras, electrical connectors, and a user interface interact with the processor 160 as discussed above. FIG. 5 illustrates an internal back of a recycling mini-kiosk 100. As shown a processor 160 is preferably a personal computer having a battery backup 170a, a wireless connection 167 for external communications, an electrical connection 140, a receipt dispenser 104 and a display screen 115.

The processor 160 identifies the electronic device 150 submitted for recycling using information from the visual inspection and user interface. The processor 160 also determines the proper electrical connector 505 for connection to the data port of the electronic device 150 using information obtained during the visual inspection or from the user interface. The processor 160 also directs and receives information from the electrical analysis of the electronic device 150 performed using the electrical connector 505 connected to the data port of the electronic device 150. The processor also preferably determines a financial remuneration for the submitted electronic device 150 based on the visual inspection, optionally the electrical analysis and data stored in the memory 161 of the mini-kiosk or information provided externally through the external communication component 167.

Figure 12:
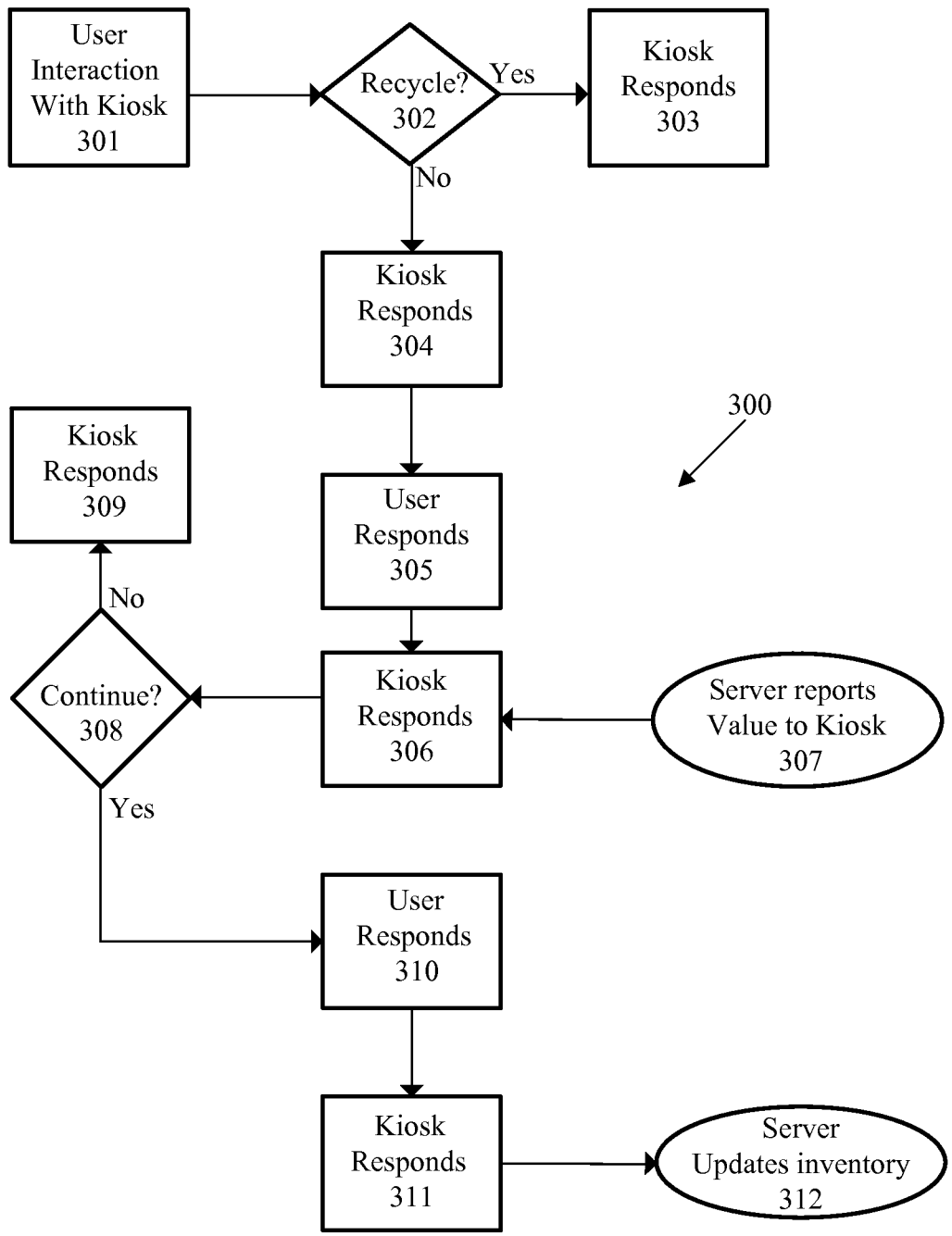
FIG. 12 is a flow chart for recycling an electronic device.

A flow chart for a preferred recycling method is shown in FIG. 12. At step 301 a customer elects to sell or recycle an electronic device. The customer checks to see if the electronic device is supported for sale/refurbishing from a list on the screen of the mini-kiosk. The customer activates the on-screen menu system and either enters the phone model directly or goes through a series of menus to determine if the electronic device is eligible for sale or only for recycling. At decision block 302 it is determined if the electronic device is only available for recycling. If yes, (i.e. it is not on the list of electronic device available for reselling) the customer can insert the electronic device into receptacle at step 303 and the electronic device falls into bin 112 for recycling.

If the electronic device is supported for refurbishment/resale the customer is then encouraged to engage the testing/rating operation of the system. At step 304, the system has determined the correct connector to couple to the electronic device. Connectivity options and are not limited to cable, standard or proprietary connectors, hard docks, reading removable or external physical memory or other wireless methods like WiFi, Bluetooth, RFID, NFC, and the like. At step 305 the electronic device is connected and inserted into inspection area 106. If this has been done correctly, the customer is given some indication (e.g. a green light) and the system proceeds to step 306. At step 306 the electronic device is tested for operation using diagnostics and operating via, for example, the OMSI interface. The diagnostics preferably includes electrical and physical testing including testing the electronic device's battery, screen, memory, button functionality and structural integrity.

Preferably, the electronic device is imaged and analysis software is used to identify scratches, cracks, wear patterns, dents, broken or missing pieces, inclusion of features such as lenses, buttons, connectors, badges, labeling and/or branding. Identification may be done by image comparison or other similar methods where the image taken of the electronic device is normalized and compared to a reference image. Other inspection methods may be used in conjunction with visual and/or electrical testing including weighing to determine specific weight and use that data to further refine verification of manufacturer and verification of exact device model. In another embodiment, the photographic image is used to identify the correct manufacturer and model number/product number. Visual identification could include any combination of the following: calculations based upon measurement, physical (e.g., mm, inches), pixel count or other. Identification based upon electronic device dimensions, location/size of buttons, LCD and other physical characteristics. One camera or multiple cameras may be used to determine height, width, depth as needed. Identification based on OCR (Optical Character Recognition) of identifiers such as Carrier (for phone and tablet computers), brand, model, serial number, other identifiers. Identification based upon barcodes. Consumer may be asked to orient CE on its front, back, side and then asked to change orientation as needed. Consumer may even be asked to remove CE cover(s), batteries and the like in order to gain access to identifiable items, such alphanumeric or barcode data. The mini-kiosk 100 provides a way to use visual inspection with electrical inspection to identify a device, determine its value, and reduce possible fraud.

In one embodiment, the mini-kiosk 100 communicates with the carrier associated with a mobile phone to collect any information that could be germane to the device, including, for example, validation or authentication, registered ownership, account status, time in service, and the like. In some cases, when the customer's identification information does not match the registered owner information, the mini-kiosk 100 automatically contacts the assumed owner in some manner (automated telephone call, email, text message, etc.) to alert the owner of the phone of the possible transaction.

Another feature of an embodiment of the mini-kiosk 100 is to determine if there is personal information on the electronic device. This is determined by the presence of data in particular storage registers in the memory (e.g., quick-key stored numbers) or by looking at file types (jpegs, mp3's, etc.,), or just assuming all non-default storage locations must contain personal data. The customer is offered the chance to erase the data from the phone. One option allows the customer to request that the data be first downloaded and then sent to a location designated by the customer (e.g., email address, website, etc.). In another embodiment, there is a slot for the customer to enter a memory card (e.g. USB drive. memory stick, etc.) whereupon the mini-kiosk 100 uploads the data to the memory device. In still another embodiment, the mini-kiosk 100 offers a web location from which the user retrieves the data at some later time if desired. In another embodiment, the user elects to have the data placed in another electronic device purchased by the customer at the mini-kiosk 100 or in the location of the mini-kiosk 100 or some other store. The customer preferably selects a user name and password to access the system provided storage location.

Once the value is determined, the value is provided at step 307 to the mini-kiosk. The mini-kiosk 100 then offers the customer a price or other remuneration for the phone that is typically less than the resale value. In other embodiments, the mini-kiosk 100 offers the customer a price or remuneration that is at the current real-time market price. At step 308 it is determined if the user wishes to accept the offer. If not, the mini-kiosk 100 proceeds to step 309 and opens the door and releases the electronic device back to the customer. If the user wishes to accept the offer, the mini-kiosk 100 proceeds to step 310. At a point where the user accepts a price, the mini-kiosk 100 may then lock down the inspection area to prevent further access to the electronic device by the user. The mini-kiosk 100 then disconnects any cables that have been attached. At step 310, the user indicates acceptance of the decision by confirming on the keypad or touch-screen. At this point the mini-kiosk 100 proceeds with deleting the personal data from the electronic device. In addition, once the transaction is confirmed, the mini-kiosk 100 tags the electronic device with a transaction number that is associated with the diagnostic data and the transaction itself. This is preferably a printed adhesive label that is affixed physically to the phone and/or the loading of electronic data corresponding to the transaction number onto the phone itself for traceability purposes.

At step 311, the mini-kiosk 100 completes any additional testing and diagnostics of the electronic device, disconnects the cable from the electronic device, and prints a receipt for the customer. Transfer of funds may be authorized via the mini-kiosk 100 by crediting a customer credit card or account by dispensing cash, or by dispensing a voucher or coupon. At step 312 the mini-kiosk 100 updates its inventory database and transmits the update via a communications network to a mini-kiosk server.

The mini-kiosk 100 of the present invention may be utilized with other visual analysis methods such as disclosed in Bowles et al., U.S. patent application Ser. No. 13/753539, filed on Jan. 30, 2013, for Visual Analysis Of Recyclable Electronic Devices, which is hereby incorporated by reference in its entirety. The mini-kiosk 100 of the present invention may be utilized with other visual analysis methods such as disclosed in Bowles et al., U.S. patent application Ser. No. 13/658825 filed on Oct. 24, 2012, for Method And Apparatus For Recycling Electronic Devices, which is hereby incorporated by reference in its entirety. The mini-kiosk 100 of the present invention may be utilized with other pre-acquisition auction methods such as disclosed in Bowles et al., U.S. patent application Ser. No. 13/705252 filed on Dec. 5, 2012, for Pre-Acquisition Auction For Recycled Electronic Devices, which is hereby incorporated by reference in its entirety. The mini-kiosk 100 of the present invention may be utilized with data transfer methods such as disclosed in Bowles et al., U.S. patent application Ser. No. 13/693032 filed on Dec. 3, 2012, for Method And Apparatus For Recycling Electronic Devices, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A counter-top apparatus for recycling electronic devices, the apparatus comprising:
    a housing having a volume no greater than one cubic meter;
    an inspection area within the housing;
    at least an upper chamber camera within the inspection area; and
    a processor in electrical communication with at least the upper chamber camera, wherein the inspection area further comprises a transparent plate and a plurality of mirrors, wherein the plurality of mirrors allow for obtaining multi-angled views of an electronic device placed within the inspection area, wherein the combination of each of the upper chamber camera, a lower chamber camera and the plurality of mirrors allow for obtaining a 360 degree view of the electronic device placed on the transparent plate, and wherein the transparent plate is rotatable.

2. The apparatus according to claim 1 further comprising a plurality of electrical connectors, each of the plurality of electrical connectors different and at least one of the electrical connectors being removably connectable to the electronic device.

3. The apparatus according to claim 2 wherein the processor is in communication with each of the plurality of electrical connectors and a user interface on an exterior of the housing, the processor configured to identify a brand and model number of the electronic device based on at least one of information from a user and images from at least the upper chamber camera, the processor configured to determine the at least one electrical connector to dispense to the inspection area, the processor configured to perform a visual analysis of a display of the electronic device, the processor configured to perform an electrical analysis of the electronic device, and the processor configured to determine a financial remuneration value for the electronic device.

4. The apparatus according to claim 1 wherein the inspection area has ultraviolet lighting.

5. The apparatus according to claim 1 wherein the plurality of mirrors in the inspection area allow for an image of a reflection of the electronic device placed on the transparent plate.

6. The apparatus according to claim 1 wherein the apparatus has a mass ranging from 2 kilograms to 50 kilograms.

7. The apparatus according to claim 1 wherein the apparatus has a length, L, ranging from 20 centimeters to 100 centimeters, a width, W, ranging from 20 centimeters to 100 centimeters, and a height, H, ranging from 20 centimeters to 100 centimeters.

8. The apparatus according to claim 1 wherein the processor is further configured to offer a consumer a pre-acquisition purchase price for a recycled electronic device with the pre-acquisition purchase price established by a winning bid from a bidder of a plurality of bidders.

9. A kiosk for recycling electronic devices, the kiosk comprising:
    a housing;
    an inspection area within the housing;
    a transparent plate within the inspection area and configured to support an electronic device placed thereon;
    at least first and second mirrors positioned within the inspection area, wherein the first mirror is positioned to reflect a first image of the electronic device, and wherein the second mirror is positioned to reflect a second image of the electronic device;
    at least a first imaging component positioned within the inspection area above the transparent plate, wherein the first imaging component is configured to obtain a multiple view image of the electronic device, the multiple view image comprising the first image reflected by the first mirror and the second image reflected by the second mirror; and
    a processor in electrical communication with at least the first imaging component, wherein the processor is configured to evaluate the electronic device based on the first and second images of the electronic device.

10. The kiosk according to claim 9, further comprising an electrical connector for connection to the electronic device, the electrical connector in electrical communication with the processor, and wherein the processor is also configured to perform an electrical analysis of the electronic device via the electrical connector.

11. The kiosk according to claim 9, wherein the processor is further configured to measure a luminescence from a LCD screen of the electronic device within an illumination period.

12. The kiosk according to claim 9 further comprising a user interface on an exterior surface of the housing for the user to input information.

13. The kiosk according to claim 9 wherein the inspection area further comprises an upper chamber, and wherein the first and second mirrors are disposed within the upper chamber.

14. The kiosk according to claim 9 wherein the kiosk has a mass ranging from 2 kilograms to 50 kilograms.

15. The kiosk of claim 9 wherein the multiple view image obtained by the first imaging component is used by the processor to determine the height, width and depth of the electronic device.

16. The kiosk of claim 9, further comprising a second imaging component positioned within the inspection area below the transparent plate, wherein the second imaging component is configured to obtain a third image of the electronic device through the transparent plate, and wherein the processor is configured to evaluate the electronic device based on the first, second, and third images of the electronic device.

17. The kiosk of claim 9 wherein the processor is further configured to identify the electronic device by comparison of at least one of the first and second images to a reference image.

18. The kiosk of claim 9 wherein the processor is further configured to identify the electronic device by normalizing at least one of the first and second images, and then comparing the normalized image to a reference image.

19. The kiosk of claim 9 wherein the processor is further configured to generate a 3-D profile of the electronic device based at least in part on the first and second images.

20. The kiosk of claim 9, wherein the housing has a length, L, ranging from 20 centimeters to 100 centimeters, a width, W, ranging from 20 centimeters to 100 centimeters, and a height, H, ranging from 20 centimeters to 100 centimeters.

\* \* \* \* \*